United States Patent [19]

Chailloux

[11] 4,196,342
[45] Apr. 1, 1980

[54] HOUSEHOLD APPARATUS FOR THE ROASTING OF COFFEE IN SMALL QUANTITIES

[75] Inventor: Pierre Chailloux, Iteuil-Liguge, France

[73] Assignee: Marielle Touillet, Poitiers, France

[21] Appl. No.: 795,075

[22] Filed: May 9, 1977

[30] Foreign Application Priority Data

May 10, 1976 [FR] France ............................ 76 13952

[51] Int. Cl.$^2$ .......................................... A47J 31/42
[52] U.S. Cl. .................................... 219/385; 99/286; 99/287; 99/288; 99/348; 219/389
[58] Field of Search ................ 99/286, 290, 348, 287, 99/288; 366/292–296, 144–146; 241/65; 219/389, 385; 34/139

[56] References Cited

U.S. PATENT DOCUMENTS

| | | | |
|---|---|---|---|
| 1,633,164 | 6/1927 | Cruickshank | 241/65 |
| 1,812,016 | 6/1931 | Nieloud | 219/389 |
| 1,985,604 | 12/1934 | Fitzgerald | 219/389 |
| 2,109,597 | 3/1938 | Richeson | 99/348 |
| 2,141,586 | 12/1938 | Woolsey et al. | 366/146 |
| 2,154,963 | 4/1939 | Swager | 99/286 |
| 3,153,377 | 10/1964 | Bosak | 99/286 |
| 3,220,450 | 11/1965 | Aronson et al. | 99/348 |
| 4,019,722 | 4/1977 | Shohet | 366/294 |

*Primary Examiner*—Elliot A. Goldberg
*Assistant Examiner*—Bernard Roskoski
*Attorney, Agent, or Firm*—Larson, Taylor and Hinds

[57] ABSTRACT

The apparatus comprises: a container of a generally cylindrical shape or in the shape of a truncated cone capable of receiving small quantities of unroasted coffee and which can be closed by a lid and which is carried by a casing forming a base; a shaft inside the container extending in the axial direction and coupled to the output shaft of an electric motor disposed in the casing; at least one stirring means mounted on said shaft inside the container; a heating plate forming the bottom of the container and in which is embedded an electric resistance; and a timer disposed in said casing and having at least two controlled switches, one of which is in series with the current supply circuit for said motor and the other is in series with said heating resistance, this timer being adapted to determine, particularly with respect to the quantity of coffee to be roasted and with the degree of roasting desired, the heating time of the heating plate and the time during which said stirring member is driven.

The stirring member can be replaced by a pulverizing member, or its direction can be modified, so as to serve as the pulverizing member when it is driven at a high speed.

2 Claims, 6 Drawing Figures

HOUSEHOLD APPARATUS FOR THE ROASTING OF COFFEE IN SMALL QUANTITIES

BACKGROUND OF THE INVENTION

It is known that for coffee to have all its flavour, it should be consumed less than eight to ten days after it has been roasted.

Now, when we buy coffee already roasted in the shop, we can suppose that almost always the roasting took place more than eight days beforehand, because in order to satisfy permanently the demand, retailers must keep a large stock which is generally stored for several days or several weeks in their shop.

SUMMARY OF THE INVENTION

The invention relates then to a household appliance for roasting coffee in small quantities, which allows discerning coffee drinkers to drink freshly roasted coffee having a much more pleasant taste than if it had been bought already roasted.

An appliance according to the invention has then as its aim to allow coffee drinkers themselves to roast their coffee according to their needs and to prepare their favourite coffee from unroasted coffees of different origins whilst still saving money.

For this purpose a household apparatus for roasting coffee in small quantities according to the invention is characterised in that it comprises; a container having generally a cylindrical shape or the shape of a truncated cone able to receive small quantities of unroasted coffee and which can be closed by a lid and which is carried by a casing forming a base; a shaft inside the container extending in the axial direction and coupled to the output shaft of an electric motor disposed in the casing; at least one stirring member mounted on said shaft inside said container; a heating plate forming the bottom of the container and in which is embedded an electric resistance; and a timer disposed in said casing and having at least two controlled switches, one of which is in series with the supply circuit for said motor and the other is in series with said heating resistance, this timer being adapted to determine, particularly with respect to the quantity of coffee to be roasted and the degree of roasting desired, the heating time for the heating plate and the time during which said stirring member is driven.

In such an apparatus, it is clear that it is the heating plate which will progressively cause, up to the degree desired, the roasting of the coffee, the stirring member causing all the layers of unroasted coffee disposed in the container to come into contact with the plate.

As for the timer, it enables an entirely automatic operation of the apparatus to be obtained, its adjustment being conveniently carried out by the user for example by means of a graduated adjusting knob mounted on the casing, from the outside.

Preferably said timer is arranged so that the stirring member continues to be driven after said plate ceases to be heated, until the plate is sufficiently cold to avoid any risk of burning the roasted coffee.

An apparatus according to the invention can also be provided which is capable of grinding the coffee after it has been roasted.

For this purpose, an apparatus according to the invention can again be characterised in that said stirring member is removable and can be replaced by a pulverising or crushing means of appropriate shape, and in that there is provided a two-speed motor unit, one speed relatively slow for driving the stirring member and one speed relatively high for driving the pulverising means.

When the roasting of the coffee is finished, it only needs consequently the stirring means to be replaced by the pulverising or crushing means and to rotate the motor unit at said relatively high speed, i.e. at a speed of the order of several thousand r.p.m., so as to obtain ground coffee ready for use. With the apparatus we can then pass, without any transferring, from unroasted coffee to ground coffee and in small quantities which can be immediately consumed by one or more persons.

According to another embodiment, instead of being removable, the stirring means is made to swivel and can be moved in particular to a first position in which it can serve as the stirring means properly speaking, and is driven by a motor unit at a relatively low speed and a second position in which it can serve as the pulverising or crushing means and is driven by said unit at a relatively high speed.

When the roasting of the coffee is finished, it is sufficient to modify in an appropriate way the direction of the stirring means for it to assume the function of a pulverising or crushing member without any dismantling.

In this case said stirring member is provided essentially in the form of a blade which extends perpendicularly or almost perpendicularly to the plane of said heating plate when it is used as a stirring member properly speaking, and which is pivotably mounted on the shaft driven by the motor unit, so as to move then into a position substantially parallel to said plate and in which it can be used as a pulverising or crushing member.

According to yet another embodiment said stirring member has a shape such that it can be used as the stirring member properly speaking when it is driven by the motor unit at a relatively low speed and as the pulverising or crushing member, without its direction having to be modified, when it is driven by the motor unit at a relatively high speed.

For this the stirring member can be provided in the form of a blade whose shape corresponds approximately to the contour of the bottom of the container holding the unroasted coffee and one of whose edges at least is sharp. Of course, this blade can be provided in a form such that the cutting edge has no pulverising or crushing action when it is driven at a relatively low speed.

Thus the rotating member, fixed on the output shaft of the motor unit, will have two distinct roles, i.e. a role as a stirring member or a role as a pulverising or crushing member, according as to whether it is driven at a relatively low speed or at a relatively high speed.

Without it being necessary, but as a simple variation, said motor unit could be adapted to drive said stirring member selectively in one direction and in the opposite direction, according to whether said member is driven at a relatively low speed and serves as the stirring member properly speaking, or whether it is driven at a relatively high speed and serves as the pulverising or crushing member.

In this case, of course, it will be suitable that the blade forming the stirring member comprises at least one cutting edge able to operate on the roasted coffee when it is driven at high speed in said opposite direction to that in which it rotates, at a lower speed, when it is being used solely as the stirring member.

BRIEF DESCRIPTION OF THE DRAWINGS

Different embodiments of the invention are described below as non-limiting examples, with reference to the figures of the accompanying drawing in which.

DESCRIPTION OF THE PREFERRED EMBODIMENTS

Figure 1:
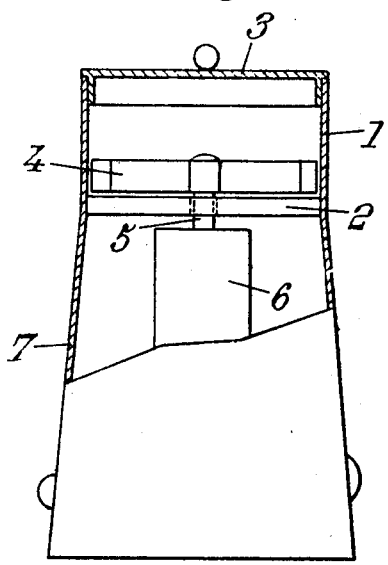
FIGS. 1 and 2 illustrate schematically and partially respectively on embodiment of the invention.
Figure 6:
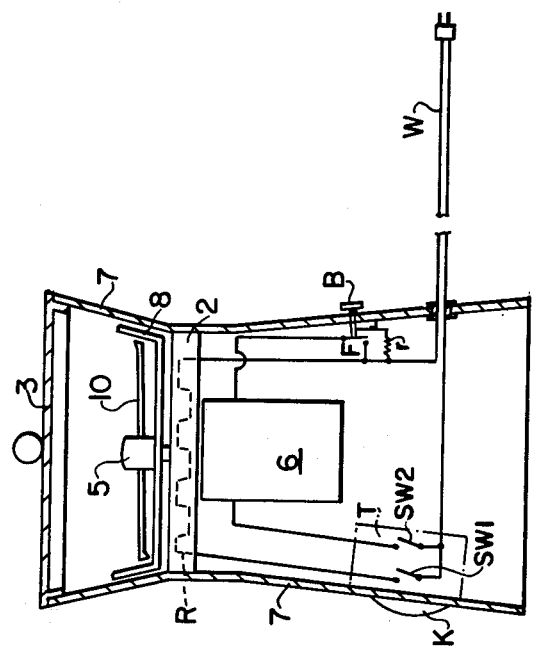
FIG. 6 illustrates the embodiment of FIG. 1 with a schematic diagram of the electrical circuitry added.

The household apparatus shown in FIGS. 1 and 6 comprises a cylindrical or slightly tapered container 1, capable of receiving quantities of unroasted coffee, and of a volume corresponding to the quantity necessary for one or more persons; the bottom of the container 1 is formed by a circular heating plate 2. A heating resistance R can be embedded in the body of plate 2 and can be connected to a power supply source through a timer T by means of a sheilded conductor or feed wire W. Container 1 can be closed by a lid 3.

Adjacent the upper face of plate 2 there is rotatably mounted a stirring member 4. For this purpose this member is mounted on the end of the shaft 5, which passes through the central opening in plate 2, of a motor unit 6. This unit is mounted in a casing or housing 7 which serves at the same time as a support for container 1 and can contain the timer T. As shown in FIG. 6, the timer T includes a pair of switches SW1 and SW2. Switch SW1 is connected in series with heating resistance R while switch SW2 is connected in series with motor unit 6. A timer control knob K controls actuation of switches SW1 and SW2.

Motor unit 6 can, of course, comprise an electric motor, able to be supplied from said source also through said timer.

A motor can be used capable, by means of an appropriate control circuit, of driving shaft 5 either at a relatively low speed, of the order of 60 to 90 r.p.m., or at a relatively high speed, of the order of several thousand r.p.m.

As illustrated in FIG. 6, the control circuit may simply comprise a two position push button switch B having contacts F and L. When in engagement with contact L, switch B provides a connection to motor 6 through a resistor r so as to provide low speed (roasting) operation. When in engagement with contact F, resistor r is shorted out and a direct connection is completed to motor 6 so as to provide high speed (crushing) operation.

As an alternative the motor unit 6 can comprise a powered reduction unit whose output shaft can be coupled or not to the rotor of the electric motor, by means of a coupler, the output shaft of the motor carrying the stirring member 4.

Thus, when the coupler is activated and the powered reduction unit is supplied with current, in the absence of a power supply for the motor, the stirring member can be driven at said relatively low speed and, when the motor is supplied with current and is no longer coupled to the powered reduction unit, the member mounted on shaft 5 can be driven at said relatively high speed.

Figure 2:
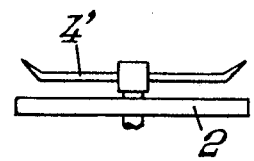

Whatever the embodiment chosen for motor unit 6, the stirring member 4 can be formed by a simple blade, whose plane is either substantially perpendicular to that of the heating plate 2 (FIG. 1), in which case since shaft 5 is driven at a low speed, member 4 can serve as a stirring member properly speaking, during the roasting phase, or is practically parallel to that of the heating plate (FIG. 2), in which case since shaft 5 is driven at a high speed, member 4 can serve as the pulverising and crushing member for the roasted coffee.

In accordance with the invention this can be effected in two different ways:

For example blade 4 can be removably fixed on shaft 5 so that, after the heating and the motor unit have been stopped at determined times by the timer, this blade can be replaced by a pulverising or crushing blade 4', possibly with cutting edges, essentially parallel to the plane of plate 2.

For the stirring and the crushing, one and the same blade 4 can also be used, and would be rotatably mounted on shaft 5 so that it can be successively moved to two positions as defined above. Thus, there is no dismantling to be done but only a change of direction of blade 4 to change from the roasting phase to the crushing phase.

Figure 3:
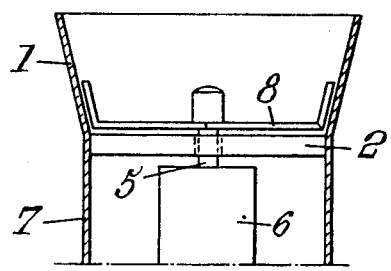
FIGS. 3 and 4 illustrate schematically and partially a third embodiment.
Figure 4:
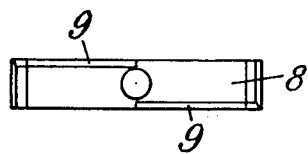

In FIGS. 3 and 4 there is diagrammatically shown a further embodiment of an apparatus according to the invention. In this case, the stirring member 8 is so shaped that, without it being necessary for it to be removably mounted or to swivel it in a different way, it can serve successively as a stirring member properly speaking or as a pulverising or crushing member, according to whether the speed of rotation which is transmitted to it by motor unit 6 is respectively relatively low or relatively high.

In particular, it can be seen that this stirring and crushing member 8 has a shape such that it corresponds approximately to the shape of the bottom of container 1. As shown in FIG. 4, which is a top view of member 8, this latter comprises two cutting edges 9 which have practically no role when member 8 is driven at a relatively low speed and serve solely as a stirring member and whose role is to crush the roasted coffee when it is driven at a relatively high speed during the pulverising phase.

Thus, rotatable member 8 can serve successively as a stirring member and as a pulverising or crushing member, without any dismantling operation and solely by modifying at the desired moment the driving speed of motor unit 6, this being done with any appropriate means.

Whatever the embodiment of the invention it is to be understood that the roasting phase can comprise a first phase and a second phase the resistance in the heating plate is supplied with current whereas the stirring member is driven at a low speed. This phase lasts, for example, for twenty minutes. During the second phase the current supplied to the resistance in the heating plate 2 is switched off and the stirring member is again driven at a relatively low speed until the heating plate is sufficiently cooled down. This last phase lasts for example, for ten minutes. To obtain such an operation all that is needed, of course, is to have an appropriate timer with double control.

Figure 5:
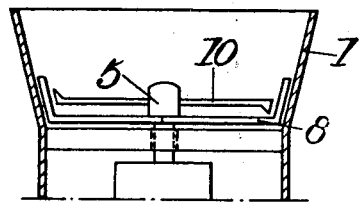
FIG. 5 shows a fourth embodiment.

Finally in FIG. 5 there is partially shown another embodiment in which shaft 5 carries a stirring member 5 and a pulverising member 10 placed one above the other. It is clear that in this case stirring member 8 is so shaped that it provides essentially the stirring function of the unit when shaft 5 is driven at a relatively low speed, whereas pulverising member 10 is so shaped that it provides essentially the pulverising function of the unit when shaft 5 is driven at a relatively high speed.

I claim:

1. A household apparatus for roasting and crushing coffee in small quantities, said apparatus comprising: a container for receiving small quantities of unroasted coffeebeans, and including a lid closure; a housing forming a base and supporting said container; a shaft member disposed inside the container and extending axially thereof; a two-speed electric motor disposed in the housing and including an output shaft coupled to said shaft member; means for setting the speed of the motor at one of two predetermined values; a stirring member and a crushing member mounted one above the other on said shaft member inside of the container for rotation therewith; a heating plate forming the bottom of the container and having an electric resistance embedded therein; and a timer means for determining the heating time of the heating plate and the time during which said stirring member is driven, with respect to the quantity of coffee to be roasted and the degree of roasting desired, said timer means being disposed in said housing and including at least two controlled switches, one of said switches being connected in series with the current supply of said motor and the other of said switches being connected in series with said heating resistance.

2. An apparatus according to claim 1, wherein said timer means causes continued rotation of the stirring member after heating of said plate is terminated for a period which ensures that the plate is sufficiently cold to avoid all risk of burning the roasted coffee.

* * * * *